United States Patent Office 3,732,251
Patented May 8, 1973

3,732,251
BASICALLY SUBSTITUTED COUMARIN
COMPOUNDS
Rudi Beyerle, Bruchkobel, and Adolf Stachel, deceased,
by Ingeburg Lydia Katharina Stachel, Rolf-Eberhard
Nitz, Klaus Resag, and Eckhard Schraven, Frankfurt
am Main, Germany, assignors to Cossella Farbwerke
Manikur Aktiengesellschaft, Frankfurt am Main-
Fechenheim, Germany
No Drawing. Continuation-in-part of application Ser. No.
789,919, Jan. 8, 1969, now Patent No. 3,652,557. This
application May 12, 1971, Ser. No. 142,757
Int. Cl. C07d 7/26
U.S. Cl. 260—343.2 R    7 Claims

ABSTRACT OF THE DISCLOSURE

The present invention relates to new coumarin compounds useful as coronary dilators and having the structural formula

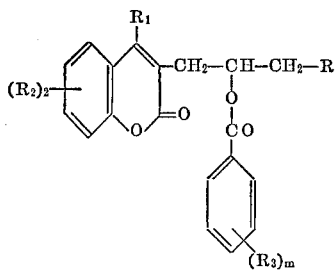

or the hydrochloric acid addition salts thereof wherein

R stands for the radical of an alkyl, alkenyl, cycloalkyl, aralkyl or aryl amine which is bound via a nitrogen atom, or for the group

X representing a lower cyanoalkyl, alkylcarbonylalkyl, alkoxycarbonylalkyl or amidocarbonylalkyl group, the alkyl and alkoxy groups containing 1–4 carbon atoms, Y representing a lower alkyl or alkoxy group containing 1–4 carbon atoms, or having the same meaning as X;

$R_1$ is selected from the group consisting of alkyl radicals having 1–4 carbon atoms and phenyl radicals;

$R_2$ is selected from the group consisting of 5,7-, 6,7-, and 7,8-positioned alkoxy groups having 1–4 carbon atoms;

$R_3$ is selected from alkoxy groups having 1–4 carbon atoms and $m$ is selected from the group consisting of 1, 2 and 3.

---

This application is a continuation-in-part of our U.S. Ser. No. 789,919, filed Jan. 8, 1969, now U.S. Pat. No. 3,652,557.

The present invention relates to new pharmacologically valuable, basically substituted coumarin compounds having the structural formula

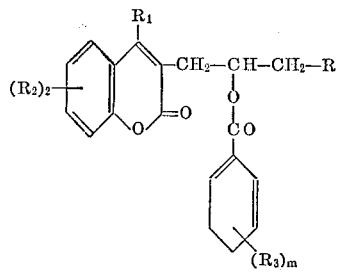

or the hydrochloric acid addition salts thereof wherein

R stands for the radical of an alkyl, alkenyl, cycloalkyl, aralkyl or aryl amine, the alkyl moieties thereof containing 1–4 carbon atoms, the alkenyl moieties 3–5 carbon atoms, the cycloalkyl moieties 3–7 carbon atoms, the aralkyl moieties 7–12 carbon atoms and the aryl moieties 6–12 carbon atoms, said amine being bound via its nitrogen atom, or for the group

X representing a lower cyanoalkyl, alkylcarbonylalkyl, alkoxycarbonylalkyl or amidocarbonylalkyl group, the alkyl and alkoxy groups containing 1–4 carbon atoms, Y representing an alkyl or alkoxy group containing 1–4 carbon atoms, or having the same meaning as X;

$R_1$ is selected from the group consisting of alkyl radicals having 1–4 carbon atoms and phenyl radicals;

$R_2$ is selected from the group consisting of 5,7-, 6,7-, and 7,8-positioned alkoxy groups having 1–4 carbon atoms;

$R_3$ is selected from alkoxy groups having 1–4 carbon atoms and $m$ is selected from the group consisting of 1, 2 and 3.

Suitable alkyl or alkenyl amines forming the group R may derive from mono and diamines, such as alkylamines, dialkylamines, alkenylamines, alkylendiamines, hydroxyalkylamines, alkoxyalkylamines and acyloxyalkylamines. Amines of this type include: methylamine, ethylamine, propylamine, butylamine, dimethylamine, diethylamine, allylmethylamine, N,N-diethyl-N'-methylethylene-diamine, N,N-diethyl - N' - methylpropylene-diamine, N-methyl-ethanolamine, N-methyl-propanolamine, N-isopropylethanolamine, N - butyl-ethanolamine, N-benzylethanolamine. The hydroxy groups of the abovementioned hydroxyalkylamines may be esterified with a carboxylic acid such as formic acid, acetic acid, carbonic acid monoester and alkoxybenzoic acids.

Suitable cycloalkylamines forming the group R may preferably derive from cyclopropylamine, cyclohexylamine and cycloheptylamine.

Suitable aralkyl amines forming the group R include, for example: phenylalkyl-alkylamines, such as benzylmethylamines, 3,4-dimethoxyphenylethyl - methylamine, 2,3,4-trimethoxyphenylethyl-methylamine, 3,4-dimethoxyphenylisopropylmethylamine, 2,3,4-trimethoxy-phenylisopropyl-methylamine.

Suitable arylamines which can be used include: N-methylaniline, N-methyl-p-anisidine, N-methyl-3,4-dimethoxy-aniline, N-methyl-3,4,5 1trimethoxyaniline, N-methyl-p-chloro-aniline.

Suitable amines forming the group

may be for instance:

Methylaminoacetonitrile, n - butylaminoacetonitrile, ethyl methylaminoacetate, methylaminoacetamide, ethyl β - methylaminopropionate, di-(β-ethoxycarbonylethyl)-amine, di-(β-cyanoethyl)-amine, β-methylaminopropionitrile, β-n-butylaminopropionamide, γ - methylamino butyric acid diethylamide, ethyl γ-methylamino-butyrate.

The coumarin compounds of the present invention can be produced according to various methods, the particular method chosen depending on the envisioned constitution of the final product.

The simplest method of producing the coumarin compounds of the present invention comprises acetylating, optionally in the presence of an acid-binding agent, coumarin derivatives having the structural formula

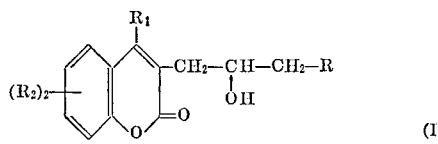

(II)

wherein R, $R_1$ and $R_2$ have the meaning set out above, with an alkoxybenzoic acid having the structural formula

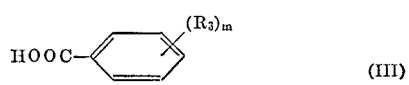

(III)

or with a functional derivative thereof and to eliminate by hydrogenation or saponification protective groups in the radical R, if any, which are capable of splitting off and are linked to oxygen or nitrogen atoms.

The 3-γ-amino-β-hydroxy-propyl-coumarins required as starting materials for this process can be produced by reacting according to known methods, as for example, according to the teachings of British Pats. Nos. 1,067,626 and 1,135,907, the corresponding amines with the 3-γ-halogen-β-hydroxy-propyl-coumarins, or with the corresponding 3-(2′,3′-epoxy-propyl)-coumarins. Even if primary amines are used as starting materials for this process, it is surprising that the substitution of the halogen atom of 3-γ-halogen-β-hydroxy-propyl-coumarins by the amine radical gives satisfactory yields without involving any adverse side reactions. By subsequent alkylation the hydrogen atom of a secondary amino group, if any, may be substituted by an alkyl or aralkyl radical.

By using starting materials, wherein the radical of an amine R, bound via the nitrogen atom, contains a hydroxyalkyl group, the corresponding diesters are obtained if 2 moles of the alkoxybenzoic acid, or functional derivative thereof, are employed.

Those coumarin compounds of the present invention wherein the radical R is bound via the nitrogen atom of a secondary amino group can also be prepared by starting from such coumarin derivatives of the above structural Formula II in which the final secondary amino group contains a protective group capable of splitting off. Thus, after the acetylation of the secondary hydroxyl group with an alkoxybenzoic acid, or the functional derivative thereof, and after the subsequent splitting off of the N-positioned protective group, the secondary alkoxybenzoic acid esters of coumarin of the present invention having the structural Formula I are obtained, which contain a secondary amino group in the molecule. Particularly suited as protective groups in the above-mentioned sense, which are capable of splitting off are, for instance, the benzyl and benzyloxycarbonyl radicals.

It is advisable to prepare such coumarin derivatives containing a free primary hydroxyl group in the amine radical R by stepwise esterification. In this instance the primary hydroxyl group is first protected by means of an acyl radical as protective group capable of splitting off, then the secondary hydroxyl group that is still free is reacted with an alkoxybenzoic acid, or functional derivative thereof, and finally the above-mentioned acyl radical is split off again from the primary hydroxyl group.

Another method of preparing the new coumarin compounds of the present invention comprises reacting, optionally in the presence of an acid-binding agent a compound having the structural formula

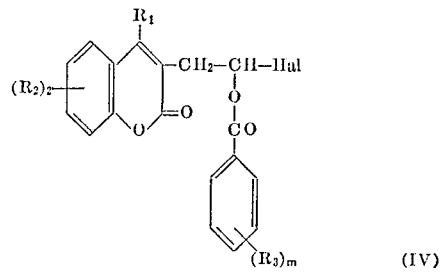

(IV)

wherein Hal stands for a halogen atom, with an amine having the formula RH, where R has the meaning set out above.

The starting materials having the structural Formula IV can be produced by acetylating the corresponding 3-γ-halogen-β-hydroxy-propyl-courmarins with an alkoxybenzoic acid having the Formula III shown above, where the radicals have the previously described meanings.

Those new coumarin compounds of the present invention wherein R means

X and Y having the meanings set out above can also be produced by reacting, if desired in the presence of an acid-binding agent coumarin derivatives having the structural formula

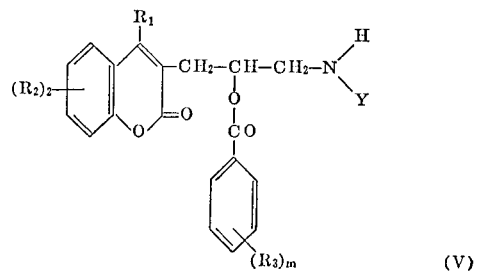

(V)

wherein the various radicals have the meanings set out above, with halogenoalkyl-nitriles, halogenoalkyl-ketones, halogenoalkyl carboxylic acid esters and halogenoalkyl-carboxamides which are capable of forming the substituent X.

If, in the residue

the substituent X means a cyanoethyl, alkylcarbonylethyl, alkoxycarbonylethyl or amidocarbonylethyl radical, these compounds can also be prepared by the addition of the corresponding coumarin derivatives to the corresponding α,β-unsaturated nitriles, ketones, carboxylic acid esters or carboxylic acid amides.

In case the substituent X stands for a cyanomethyl radical, these compounds can also be prepared by reacting the corresponding coumarin derivatives with formaldehyde and hydrocyanic acid.

Required starting materials for the preparation of the coumarin compounds of the present invention can also be obtained by reacting, if desired in the presence of an acid-binding agent, coumarin derivatives having the structural formula

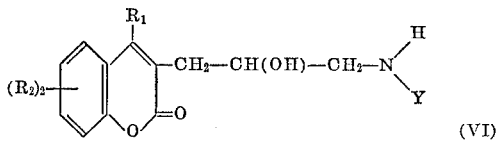

(VI)

wherein the various radicals have the meanings set out above, with the corresponding halogenoalkylnitriles, halogenoalkyl-ketones, halogenoalkyl carboxylic acid esters and halogenoalkyl-carboxamides. If, in the initial products required for the process, the substituent X means a cyanoethyl, alkylcarbonylethyl, alkoxycarbonylethyl or amidocarbonylethyl radical, these compounds can also be prepared by addition of the above-mentioned coumarin derivatives to the correspondingly substituted α,β-unsaturated nitriles, ketones, carboxylic acid esters or carboxamides. A further suitable method for the preparation of these initial products containing cyanomethylamino groups consists in the reaction of the corresponding coumarin derivatives with formaldehyde and hydrocyanic acid.

The coumarin derivatives obtainable under the present invention are valuable pharmaceutics. In particular, they are excellent coronary dilators and, in this respect, superior to other known substances having such properties.

Their salts are colorless, crystalline substances that easily dissolve in water.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schaper, R. Xhonneux, and J. M. Bogaard "Über die kontinuierliche Messung des Sauerstoffdrucks im venösen Coronarblut" (Naunyn-Schmiedeberg's Arch. exp. Path. u. Pharmak, 245, 383–389 (1963)). The test preparations were applied intravenously to the narcotized and spontaneously breathing animals. On these test conditions the dilation of the coronary arteries caused by the test substances along with the increase in the coronary blood flow led to to an increase in the oxygen tension in the coronary veinous blood. This oxygen tension was measured according to polargraphic methods by means of a platin electrode of the Gleichmann-Lübbers type (see U. Gleichmann and D. W. Luebbers "Die Messung des Sauerstoffdrucks in Gasen und Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective dihydrochlorides:

| Preparation | LD₅₀, g./kg., mouse | Dosage, mg./kg., i.v. | Maximal increase in oxygen tension in the coronary veinous blood in— | | Maximal change in the heart rate, in— | | Maximal change in the blood pressure (systolic/diastolic) in— | |
|---|---|---|---|---|---|---|---|---|
| | | | Percent | Minutes | Percent | Minutes | Percent | Minutes |
| 3-[γ-(N-methyl-N-β-cyanoethyl-amino)-β-(3,4,5-trimethoxybenzoxy)-propyl]-4-methyl-7,8-dimethoxy-coumarin. | ¹ 160 | 0.5 | +182 | >60 | −9 | >60 | −8/−14 | >60 |
| 3-[γ-[N,N-bis-(β-ethoxycarbonylethyl)-amino]-β-(3,4,5-trimethoxybenzoxy)-propyl]-4-methyl-7,8-dimethoxy-coumarin. | | 0.5 | +74 | 30 | −10 | >30 | −5/+7 | >30 |
| 3-[γ-(N-methyl-N-bicyclo-[2.2.1]-hept-2-ylmethylamino)-β-(3,4,5-trimethoxybenzoxy)-propyl]-4-methyl-7,8-dimethoxy-coumarin. | ¹ 0.11 | 0.5 | +113 | 25 | −7 | >25 | −14/−17 | 20 |
| 3-[γ-(N-methyl-N-bicyclo-[2.2.1]-hept-2-en-6-ylmethyl-amino)-β-(3,4,5-trimethoxybenzoxy)-propyl]-4-methyl-7,8-dimethoxy-coumarin. | ¹ 0.13 | 0.5 | +61 | >35 | −8 | >35 | ±0/−5 | 5 |
| 3-[γ-(N-methyl-N-cyclopropylamino)-β-(3,4,5-trimethoxybenzoxy)-propyl]-4-methyl-7,8-dimethoxy-coumarin. | ¹ 0.06 | 0.5 | +36 | 40 | +12 | >20 | −6/−16 | 20 |
| 3-[γ-(N-methyl-N-cyclohexylamino)-β-(3,4,5-trimethoxybenzoxy)-propyl]-4-methyl-7,8-dimethoxy-coumarin. | | 0.5 | +73 | >110 | −28 | >110 | −18/−50 | >110 |
| 3-[γ-diethylamino-β-(3,4,5-trimethoxybenzoxy)-propyl]-4-methyl-7,8-dimethoxy-coumarin. | ¹ 0.026 | 0.5 | +70 | 40 | +7 | 40 | −17/−29 | 20 |
| 3-[γ-diethylamino-β-(3,4,5-trimethoxybenzoxy)-propyl]-4-n-propyl-7,8-dimethoxy-coumarin. | ¹ 0.05 | 0.5 | +35 | >65 | +6 | >65 | −25/−23 | >65 |
| 3-[γ-diethylamino-β-(3,4,5-trimethoxybenzoxy)-propyl]-4-phenyl-7,8-dimethoxy-coumarin. | | 0.5 | +55 | 30 | +16 | >40 | ±0 | |
| 3-[γ-diethylamino-β-(3,4,5-trimethoxybenzoxy)-propyl]-4-phenyl-6,7-dimethoxy-coumarin. | ² 0.6 | 1.0 | +75 | 10 | −11 | 10 | −5/−15 | >20 |
| 3-[γ-(N-methyl-N-3,4-dimethoxyphenylisopropylamino)-β-(3,4,5-trimethoxybenzoxy)-propyl]-4-methyl-7,8-dimethoxy-coumarin. | | 0.5 | +30 | >55 | −10 | 30 | −5/−22 | 30 |
| 3-[γ-(N-methyl-N-allyl-amino)-β-(3,4,5-trimethoxybenzoxy)-propyl]-4-methyl-7,8-dimethoxy-coumarin. | ¹ 0.015 | 0.5 | +64 | >55 | −15 | >55 | +23/+13 | >55 |
| 3-[γ-(N-methyl-N-ethoxy-propyl-amino)-β-(3,4,5-trimethoxybenxozy)-propyl]-4-methyl-7,8-dimethoxy-coumarin. | | 0.5 | +105 | >40 | −12 | 25 | +11/+11 | 2 |
| 3-[γ-(N-methyl-N-diethylaminopropyl-amino)-β-(3,4,5-trimethoxybenzoxy)-propyl]-4-methyl-7,8-dimethoxy-coumarin. | ¹ 0.0525 | 0.5 | +65 | >80 | −18 | >80 | −17/−27 | 35 |
| 3-[γ-(N-methyl-N-3,4-dimethoxyphenethyl-amino)-β-(3,4,5-trimethoxybenzoxy)-propyl]-4-methyl-7,8-dimethoxy-coumarin. | | 0.5 | +27 | 30 | −9 | 30 | +4/−17 | 10 |
| 3-[γ-(N-methyl-N-2,3,4-trimethoxyphenethyl-amino)-β-(3,4,5-trimethoxybenzoxy)-propyl]-4-methyl-7,8-dimethoxy-coumarin. | | 0.5 | +36 | 90 | −15 | >90 | −14/−16 | >90 |
| 3-[γ-(N-methyl-N-2,3,4-trimethoxyphenylisopropylamino)-β-(3,4,5-trimethoxybenzoxy)-propyl]-4-methyl-7,8-dimethoxy-coumarin. | | 0.5 | +52 | >40 | −10 | >40 | −11/−15 | >40 |
| 3-[γ-N-methylamino-β-(3,4,5-trimethoxybenzoxy)-propyl]-4-methyl-7,8-dimethoxy-coumarin. | ¹ 0.067 | 0.5 | +74 | >30 | −3 | 2 | −10/−23 | >30 |
| 3-[γ-N-n-butylamino-β-(3,4,5-trimethoxybenzoxy)-propyl]-4-methyl-7,8-dimethoxy-coumarin. | | 1.0 | +113 | 20 | −39 | 5 | −12/−37 | >20 |
| 3-[γ-[N-methyl-N-β-(3,4,5-trimethoxybenzoxy)-ethylamino]-β-(3,4,5-trimethoxybenzoxy)-propyl]-4-methyl-7,8-dimethoxy-coumarin. | ¹ 0.095 | 0.5 | +200 | >60 | −9 | 60 | +15 | >60 |

| Preparation | LD$_{50}$, g./kg., mouse | Dosage, mg./kg., i.v. | Maximal increase in oxygen tension in the coronary veinous blood in— | | Maximal change in the heart rate, in— | | Maximal change in the blood pressure (systolic/diastolic) in— | |
|---|---|---|---|---|---|---|---|---|
| | | | Percent | Minutes | Percent | Minutes | Percent | Minutes |
| 3-[γ-{N-methyl-N-β-(3,4,5-trimethoxybenzoxy)-ethylamino}-β-(3,4,5-trimethoxybenzoxy)-propyl]-4-n-propyl-7,8-dimethoxy-coumarin | | 0.5 | +41 | 20 | +92 | 20 | −6/−11 | 10 |
| 3-[γ-{N-methyl-N-β-(3,4,5-trimethoxybenzoxy)-ethylamino}-β-(3,4,5-trimethoxybenzoxy)-propyl]-4-methyl-6,7-dimethoxy-coumarin | ² >1.0 | 0.5 | +30 | 20 | −5 | 20 | −4/−5 | >20 |
| 3-[γ-{N-methyl-N-β-(3,4,5-trimethoxybenzoxy)-ethylamino}-β-(3,4,5-trimethoxybenzoxy)-propyl]-4-methyl-5,7-dimethoxy-coumarin | ² >1.0 | 0.5 | +40 | 20 | −2 | 5 | +1.5/−1 | 3 |
| 3-[γ-(N-n-butyl-N-β-hydroxyethylamino)-β-(3,4,5-trimethoxybenzoxy)-propyl]-4-methyl-7,8-dimethoxy-coumarin | ² 0.23 | 0.5 | +238 | >70 | −13 | 30 | −14/−26 | >70 |
| 3-[γ-(N-methyl-N-β-hydroxyethylamino)-β-(3,4,5-trimethoxybenzoxy)-propyl]-4-methyl-7,8-dimethoxy-coumarin | ¹ 0.18 | 0.5 | +92 | >60 | −16 | >60 | −12.5/−22 | >60 |
| 3-[γ-(N-methyl-N-β-hydroxyethyl-amino)-β-(3,4,5-trimethoxybenzoxy)-propyl]-4-methyl-6,7-dimethoxy-coumarin | ¹ 0.16 | 0.5 | +97 | >40 | +3 | >40 | −34/−34 | >40 |
| 3-[γ-(N-methyl-N-β-methylcarbonylethyl-amino)-β-(3,4,5-trimethoxybenzoy)-propyl]-4-methyl-7,8-dimethoxy-coumarin | ¹ 100 | 0.5 | +45 | ≥35 | −28 | >35 | −41/−41 | >35 |
| 3-[γ-(N-methyl-N-β-ethoxycarbonylethyl-amino)-β-(3,4,5-trimethoxybenzoy)-propyl]-4-methyl-7,8-dimethoxy-coumarin | ² 700 | 0.25 | +40 | >35 | +10 | 10 | −14/−18 | >35 |
| 3-[γ-(N-γ-ethoxypropyl-N-β-aminocarbonylethyl-amino)-β-(3,4,5-trimethoxybenzoxy)-propyl]-4-methyl-7,8-dimethoxy-coumarin | | 0.5<br>0.05 | +104<br>+98 | >80<br>>40 | −14<br>+28 | 40<br>>40 | −38/−51<br>+10/±0 | >80<br>3 |
| 3-[γ-(N-γ-ethoxypropyl-N-β-cyanoethyl-amino)-β-(3,4,5-trimethoxybenzoxy)-propyl]-4-methyl-7,8-dimethoxy-coumarin | ¹ 160 | 0.5 | +178 | >45 | −23 | >45 | −8/−33 | >45 |
| 3-[γ-(N-n-butyl-N-βcyanoethyl-amino-β-(3,4,5-trimethoxybenzoxy)-propyl]-4-methyl-7,8-dimethoxy-coumarin | ¹ 160 | 0.5 | +132 | >85 | −15 | 55 | −12/−19 | >85 |
| 3-[γ-(N-n-butyl-N-β-aminocarbonylethyl-amino)-β-(3,4,5-trimethoxybenzoxy)-propyl]-4-methyl-7,8-dimethoxy-coumarin | ¹ 210 | 0.5 | +49 | >30 | −5 | 30 | −15/−19 | 30 |
| 3-[γ-(N-n-butyl-N-β-methylcarbonylethyl-amino)-β-(3,4,5-trimethoxybenzoxy)-propyl]-4-methyl-7,8-dimethoxy-coumarin | | 0.25 | +50 | >65 | −15 | >65 | −13/−18 | >65 |
| 3-[γ-(N-methyl-N-cyanomethyl-amino)-β-(3,4,5-trimethoxybenzoxy)-propyl]-4-methyl-7,8-dimethoxy-coumarin | ¹ 130 | 0.1 | +23 | 20 | ±0 | | ±0 | |
| 3-[γ-(N-methyl-N-β-cyanopropyl-amino)-β-(3,4,5-trimethoxybenzoxy)-propyl]-4-methyl-7,8-dimethoxy-coumarin | ¹ 160 | 0.1 | +70 | >45 | +25 | >45 | +9/−13 | >45 |

¹ Intravenous.
² Intraperitoneal.

In the preparation of dragées and tablets containing as essential active ingredient the coumarin compounds of our invention the above substances can be admixed with the conventional solid tabletting adjuvants, such as starch, lactose, talc and the like. Any of the tabletting materials and carriers customarily used in pharmaceutical practice can be employed.

For the preparation of the injection solutions the hydrochlorides of the coumarin compounds are particularly suited since most of them have good water-solubility. Injection solutions of water-soluble products can of course be prepared in the conventional manner by concurrently using well known suspending agents, emulsifiers and/or solubilizers.

For a better understanding of the nature and the objects of this invention, reference should be made to the accompanying examples which are of an illustrative rather than a limiting nature. Unless otherwise stated, all temperatures given in these examples are in degrees centigrade.

EXAMPLE 1

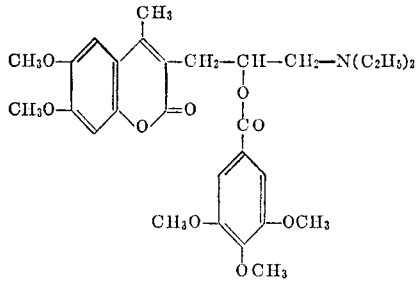

18.5 g. (0.053 mol) 3-(γ-diethylamino-β-hydroxy-propyl)-4-methyl-6,7-dimethoxy-coumarin are dissolved in 100 cc. anhydrous toluene. After the addition of 5.4 g. (0.0535 mol) triethylamine, a solution of 12.2 g. (0.053 mol) 3,4,5-trimethoxybenzoylchloride in 50 cc. anhydrous toluene is added dropwise with stirring at room temperature. Stirring is continued for 2 hours at room temperature and for another 5 hours at 100°. After cooling down, the reaction mixture, while still hot, is filtered with suction from the separated triethylamine hydrochloride. The filtrate is washed with water, then with a 10% aqueous sodium bicarbonate solution and again with water, and finally dried over anhydrous sodium sulfate. Subsequently, the solvent is distilled off at 50° in the water-jet vacuum. The residue is treated with a small amount of methanol which is subsequently filtered off with suction. By recrystallizing from methanol the 3-[γ-diethylamino-β-(3,4,5-trimethoxybenzoxy)-propyl] - 4 - methyl - 6,7-dimethoxy-coumarin is obtained, having a melting point of 165–167°.

Yield: 27 g.=88% of the theoretical.

The 3-(γ-diethylamino-β-hydroxy-propyl)-4-methyl-6,7-dimethyl-coumarin used as the starting material can be prepared as follows:

(a) 28.4 g. (0.1 mol) 3-(γ-chloro-β-hydroxy-propyl)-4-methyl-6,7-dihydroxy-coumarin (prepared by condensing α-acetyl-γ-chloromethyl-butyrolactone with 1,2,4-triacetoxybenzene, in accordance with the method described in British Pat. No. 1,044,608) are dissolved with heating in 300 cc. dioxan. After cooling down to 30°, 37.8 g. (0.3 mol) dimethyl sulfate are added. Then, with stirring, a solution of 12 g. (0.3 mol) sodium hydroxide in 30 cc. water, is added dropwise. The reaction mixture is then stirred for 3 hours at 25–30° and, after a further addition of 18.9 g. (0.15 mol) dimethyl sulfate, a solution of 6 g. (0.15 mol) sodium hydroxide in 20 cc. water is added dropwise with stirring. After having stirred for 5 hours at room temperature the reaction mixture is diluted with water and the separating crude product is dissolved in methylene chloride. For further purification purposes the methylene chloride layer is first washed with a diluted sodium hydroxide solution, then with water and subsequently dried. Thus, after evaporating the methylene chloride solution to dryness under reduced pressure 3-(2',3'-epoxypropyl)-4-methyl-6,7-dimethoxy-coumarin is obtained having a melting point of 144–146°.

Yield: 18 g.=65.2% of the theoretical.

(b) 18 g. (0.065 mol) 3-(2',3'-epoxypropyl)-4-methyl-6,7-dimethoxy-coumarin are dissolved in 80 cc. ethanol and, after the addition of 14.6 g. (0.2 mol) diethylamine, stirred for 12 hours at 110° in an autoclave. After cooling down, the reaction mixture is evaporated to dryness under reduced pressure. For further purification, the residue is recrystallized from ethyl acetate. Thus, 3-(γ-diethylamino-β-hydroxy-propyl) - 4 - methyl - 6,7 - dimethoxy-coumarin is obtained in the form of colorless needles melting at 105–106°.

Yield: 18.5 g.=84% of the theoretical.

Analgously to the above described method the following starting materials can be obtained.

The 3-(γ-chloro-β-hydroxy-propyl)-6,7- or 7,8-dimethoxy-coumarins required for their preparation can be obtained as described in British Pat. No. 1,135,907. The 3 - (γ-chloro-β-hydroxy-propyl)-4-methyl-5,7-dimethoxy-coumarin having a melting point of 125–128° can be prepared by methylation with dimethyl sulfate of 3-(γ-chloro-β-hydroxypropyl) - 4 - methyl-5,7-dihydro-coumarin having a melting point of 247–248°.

The following represents examples of starting compounds of the type shown in Formula II above where the previously defined radicals have the values shown:

| (R₂)₂ | R₁ | R | Melting point, degree |
|---|---|---|---|
| 7,8-(OCH₃)₂ | CH₃ | —N(C₂H₅)₂ | 30 |
| 7,8-(OCH₃)₂ | CH₃ | —N(CH₃)—CH₂CH₂N(C₂H₅)₂ | 182 |
| 7,8-(OCH₃)₂ | C₃H₇ | —N(C₂H₅)₂ | 102 |
| 7,8-(OCH₃)₂ | C₆H₅ | —N(C₂H₅)₂ | ¹ 115 |
| 6,7-(OCH₃)₂ | C₃H₇ | —N(C₂H₅)₂ | ¹ 196 |
| 6,7-(OCH₃)₂ | C₆H₅ | —N(C₂H₅)₂ | ¹ 190 |
| 7,8-(OCH₃)₂ | CH₃ | —HN—CH₂CH=CH₂ | 15 |
| 7,8-(OCH₃)₂ | CH₃ | —HN—CH₂CH₂CH₂—OC₂H₅ | 195 |
| 7,8-(OCH₃)₂ | CH₃ | —HN—CH₂CH₂CH₂—N(C₂H₅)₂ | 110 |
| 7,8-(OCH₃)₂ | CH₃ | —HN—CH₂CH₂—C₆H₃(OCH₃)₂ | 129 |
| 7,8-(OCH₃)₂ | CH₃ | —HN—CH₂CH₂—C₆H₂(OCH₃)₃ | 140 |
| 7,8-(OCH₃)₂ | CH₃ | —HN—CH(CH₃)—CH₂—C₆H₂(OCH₃)₃ | 122 |
| 7,8-(OCH₃)₂ | CH₃ | —HN—C₆H₂(OCH₃)₃ | ¹ 219 |
| 7,8-(OCH₃)₂ | CH₃ | CH₃—N(—CH₂—CH=CH₂)— | Oil. |
| 7,8-(OCH₃)₂ | CH₃ | CH₃—N(—CH₂CH₂CH₂—OC₂H₅)— | ¹ 103 |
| 7,8-(OCH₃)₂ | CH₃ | CH₃—N(—CH₂CH₂=CH₂—N(C₂H₅)₂)— | Oil. |
| 7,8-(OCH₃)₂ | CH₃ | CH₃—N(—CH₂CH₂—C₆H₃(OCH₃)₂)— | 102 |
| 7,8-(OCH₃)₂ | CH₃ | CH₃—N(—CH₂CH₂—C₆H₂(OCH₃)₃)— | Oil |
| 7,8-(OCH₃)₂ | CH₃ | CH₃—N(—CH(CH₃)—CH₂—C₆H₂(OCH₃)₃)— | Oil |
| 7,8-(OCH₃)₂ | CH₃ | CH₃—N(—C₆H₂(OCH₃)₃)— | ² 70 |

¹ Hydrochloride.
² Hydrochloride decomposition.

In a manner similar to the procedure described in the first para of Example 1 the following compounds under the present invention can be prepared:

General formula:

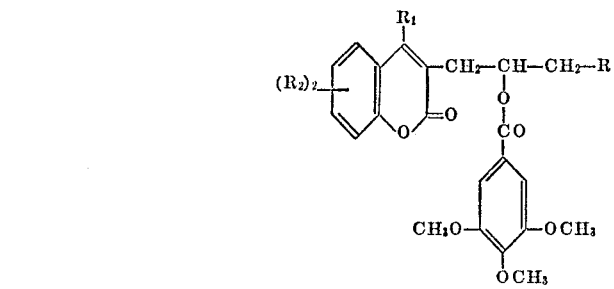

| $(R_2)_2$ | $R_1$ | R | Melting point (hydrochloride), degree |
|---|---|---|---|
| 7,8-$(OCH_3)_2$ | $CH_3$ | $-N(C_2H_5)_2$ | 229-232 |
| 7,8-$(OCH_3)_2$ | $CH_3$ | $-N(CH_3)-CH_2CH_2N(C_2H_5)_2$ | 152-153 |
| 7,8-$(OCH_3)_2$ | $C_3H_7$ | $-N(C_2H_5)_2$ | 110 |
| 7,8-$(OCH_3)_2$ | $C_6H_5$ | $-N(C_2H_5)_2$ | 116 |
| 6,7-$(OCH_3)_2$ | $C_3H_7$ | $-N(C_2H_5)_2$ | 225 |
| 6,7-$(OCH_3)_2$ | $C_6H_5$ | $-N(C_2H_5)_2$ | 100 |
| 7,8-$(OCH_3)_2$ | $CH_3$ | $-N(CH_3)-CH_2CH=CH_2$ | 70 |
| 7,8-$(OCH_3)_2$ | $CH_3$ | $-N(CH_3)-CH_2CH_2-OC_2H_5$ | 189 |
| 7,8-$(OCH_3)_2$ | $CH_3$ | $-N(CH_3)-CH_2CH_2CH_2-N(C_2H_5)_2$ | 75 |
| 7,8-$(OCH_3)_2$ | $CH_3$ | $-N(CH_3)-CH_2CH_2-C_6H_3(OCH_3)_2$ | 130 |
| 7,8-$(OCH_3)_2$ | $CH_3$ | $-N(CH_3)-CH_2CH_2-C_6H_2(OCH_3)_3$ | 115 |
| 7,8-$(OCH_3)_2$ | $CH_3$ | $-N(CH_3)-CH(CH_3)-CH_2-C_6H_2(OCH_3)_3$ | 120 |
| 7,8-$(OCH_3)_2$ | $CH_3$ | $-N(CH_3)-C_6H_2(OCH_3)_3$ | 75 |
| 7,8-$(OCH_3)_2$ | $CH_3$ | $-N(CH_3)-CH_2-cyclohexyl$ | 153 |
| 7,8-$(OCH_3)_2$ | $CH_3$ | $-N(CH_3)-CH_2-cyclohexenyl$ | 143 |
| 7,8-$(OCH_3)_2$ | $CH_3$ | $-N(CH_3)-CH(CH_3)-cyclopropyl$ | 118 |

EXAMPLE 2

48.5 g. (0.1 mol) 3-[γ-N-methyl-N-(3,4-dimethoxyphenyl-isopropyl)-amino-β-hydroxy-propyl] - 4 - methyl-7,8-dimethoxy-coumarin are dissolved in 300 cc. anhydrous benzene and 10.1 g. (0.1 mol) triethylamine are added. Then 23 g. (0.1 mol) 3,4,5-trimethoxybenzoyl-chloride dissolved in 100 cc. anhydrous benzene are added dropwise with stirring within one hour at room temperature. The mixture is then stirred under reflux for 5 hours subsequently, while hot, filtered off with suction, from the separated triethylamine hydrochloride, and finally worked up as described in Example 1. The hydrochloride of the 3-[γ-N-methyl-N-(3,4-dimethoxyphenylisopropyl)-amino-β-(3,4,5-trimethoxybenzoxy)-propyl] - 4 - methyl-7,8-dimethoxy-coumarin is obtained in the form of colorless crystals melting at 125°.

Yield: 56 g.=78% of the theoretical.

The 3-[γ-N-methyl-N-(3,4-dimethoxyphenylisopropyl)-amino-β-hydroxy-propyl] - 4 - methyl-7,8-dimethoxy-coumarin used as starting material can be obtained as follows:

(a) 31.2 g. (0.1 mol) 3-(γ-chloro-β-hydroxy-propyl)-4-methyl-7,8-dimethoxy-coumarin and 18 g. (0.1 mol) 3,4-dimethoxyphenylisopropylamine are dissolved in 200 cc. anhydrous chlorobenzene and, after the addition of 11 g. anhydrous sodium carbonate, stirred for 12 hours at 120–130°. The reaction mixture is filtered off, while hot, from the insolute and the filtrate is evaporated to dryness at 50° in the water-jet vacuum. The crude product thus obtained is recrystallized from ethyl acetate. The 3-[γ-N-(3,4 - dimethoxyphenylisopropyl)-amino-β-hydroxy-propyl]-4-methyl-7,8-dimethoxy-coumarin is obtained in the form of colorless crystals melting at 112°.

Yield: 42 g.=89% of the theoretical.

(b) 47.1 g. (0.1 mol) 3-[γ-N-(3,4-dimethoxyphenylisopropyl)-amino-β-hydroxy-propyl] - 4 - methyl - 7,8 - dimethoxy-coumarin are suspended in 500 cc. water and, after the addition of 13.4 g. of a 40% formaldehyde solution and 9 g. formic acid, stirred under reflux for 10–12 hours. After cooling down, the limpid solution is rendered alkaline (pH 9) with potassium carbonate and extracted with ethyl acetate. The ethyl acetate solution is again washed with water and dried over anhydrous sodium sulfate; then the solvent is evaporated to dryness at 40° in the water-jet vacuum. The residue is recrystallized from ethyl acetate and thus 3-[γ-N-methyl-N-(3,4-dimethoxyphenylisopropyl)-amino-β-hydroxy-propyl] - 4 - methyl-7,8-dimethoxy-coumarin is obtained in the form of colorless crystals which melt at 90°.

Yield: 38 g.=78% of the theoretical.

EXAMPLE 3

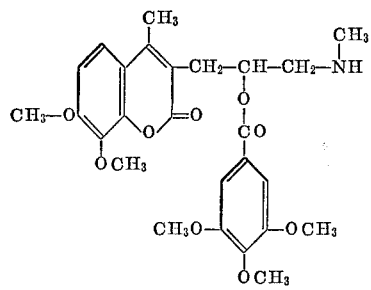

26 g. (0.0655 mol) 3-(γ-N-methyl-N-benzyl-amino-β-hydroxy-propyl)-4-methyl - 7,8 - dimethoxy-coumarin are dissolved in 200 cc. anhydrous benzene and 10.1 g. (0.1 mol) triethylamine are added. A solution of 23 g. (0.1 mol) 3,4,5-trimethoxybenzoylchloride in 80 cc. anhydrous benzene is then added dropwise with stirring at room temperature. Stirring is continued for 2 hours, then the reaction mixture is heated to the boil and stirred under reflux for another 5 hours. After cooling down the precipitated triethylamine hydrochloride is filtered off with suction and the filtrate is evaporated to dryness under reduced pressure. The residue thus obtained is dissolved in ethyl acetate. For further purification the ethyl acetate solution is washed with water, a 10% aqueous sodium bicarbonate solution and again with water. After having been dried over anhydrous sodium sulfate the ethyl acetate solution is evaporated to dryness in a vacuum and the resulting oily residue is admixed with anhydrous ether. Thus, 3-[γ-N-methyl-N-benzyl-amino - β - (3,4,5 - trimethoxybenzoxy)-propyl]-4-methyl-7,8-dimethoxy-coumarin is obtained in the form of colorless needles melting at 118–120°.

Yield: 25 g.=64.6% of the theoretical.

25 g. (0.0423 mol) 3-[γ-N-methyl-N-benzyl-amino-β-(3,4,5-trimethoxybenzoxy)-propyl]-4-methyl - 7,8 - dimethoxy-coumarin are dissolved in 150 cc. ethanol and, after the addition of the equivalent amount of alcoholic hydrochloric acid, hydrogenized at 40° with 3 g. of a 5% palladium coal and with a hydrogen pressure of 2 atmospheres. After approx. 2 hours the hydrogenation is finished. The catalyst is filtered off, while hot, and the filtrate is evaporated to dryness in a vacuum. The residue is stirred with anhydrous ether. After the mixture has been allowed to stand for a while, the hydrochloride of 3-[γ-methyl-amino-β-(3,4,5-trimethoxybenzoxy)-propyl] - 4 - methyl-7,8-dimethoxy crystallizes out in the form of colorless needles melting at 166–169°.

Yield: 19 g.=83.7% of the theoretical.

The 3 - (γ - N - methyl-N-benzyl-amino-β-hydroxy-propyl)-4-methyl-7,8 - dimethoxy - coumarin required as starting material can be prepared as follows:

(a) 31.2 g. (0.1 mol) 3-(γ-chloro-β-hydroxy-propyl)-4-methyl-7,8-dimethoxy-coumarin and 21.4 g. (0.2 mol) benzylamine are dissolved in 150 cc. anhydrous chlorobenzene and, after the addition of 11 g. anhydrous sodium carbonate, stirred for 15 hours at 120°. After cooling down, the precipitated sodium chloride is filtered off with suction and the filtrate is evaporated to dryness under reduced pressure. The residue thus obtained is dissolved in ethyl acetate, washed with water and the ethyl acetate solution, after having been dried over potassium carbonate is evaporated to dryness under reduced pressure. The reaction product crystallizes out in the form of colorless needles melting at 112–114°.

Yield: 28 g.=73% of the theoretical.

(b) 28 g. (0.073 mol) 3-(γ-benzylamino-β-hydroxy-propyl)-3-methyl-7,8-dimethoxy-courmarin are dissolved in a mixture of 22 g. of a 90% formic acid, 25 cc. water and 16.5 cc. of a 40% aqueous formaldehyde solution and heated for 10 hours with stirring under reflux. After cooling down, the reaction mixture is rendered alkaline by introducing solid potassium carbonate, and the precipitating oil is dissolved in ethyl acetate. The ethyl acetate solution is washed several times with water and, after having been dried over anhydrous potassium carbonate, evaporated to dryness under reduced pressure. Thus, 3-(γ-N-methyl-N-benzyl-amino-β-hydroxy-propyl)-4-methyl-7,8-dimethoxy-coumarin is obtained in the form of a colorless oil which may be used without additional purification for further reactions.

Yield: 26 g.=90% of the theoretical.

EXAMPLE 4

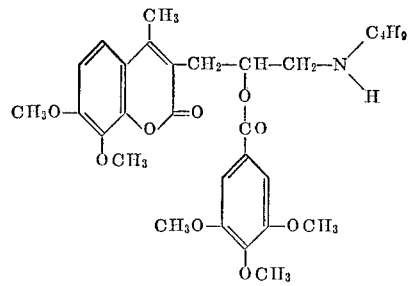

28 g. (0.058 mol) 3-(γ-N-benzyloxycarbonyl-N-n-butyl - amino - β - hydroxy-propyl)-4-methyl-7,8-dimethoxy-coumarin are suspended in 200 cc. anhydrous toluene and 9 g. (0.09 mol) triethylamine are added. A solution of 0.2 g. (0.09 mol 3,4,5-trimethoxybenzoylchloride in 80 cc. anhydrous toluene is then added dropwise, with stirring, at room temperature. The reaction mixture is stirred at 100° for 12 hours and, after cooling down, washed with a 10% aqueous sodium bicarbonate solution and with water. The toluene layer separated, dried over anhydrous potassium carbonate and evaporated to dryness under reduced pressure. The oily residue is stirred, with heating, in anhydrous ether and filtered off from small quantities of solids. After having been allowed to stand for a while, 3-[γ-N-benzyloxycarbonyl-N-n-butyl-amino-β - (3,4,5 - trimethoxy-benzoxy)-propyl]-4-methyl-7,8-dimethoxy-courmarin crystallizes out in the form of colorless needles melting at 98–102°.

Yield: 28 g.=71.2% of the theoretical.

28 g. (0.0414 mol) 3-[γ-N-benzyloxycarbonyl-N-n-butyl - amino - β-(3,4,5-trimethoxybenzoxy)-propyl]-4-methyl-7,8-dimethoxy-coumarin are introduced, with stirring, at the room temperature into 80 g. glacial acetic acid saturated with gaseous hydrobromic acid. When the introduced substance has dissolved with the generation of carbon dioxide, the reaction mixture is stirred for 1 hour at room temperature. The limpid reaction solution is then diluted with 5 times the quantity of anhydrous ether. After having been allowed to stand for a while, the hydrobromide of 3[ - γ - n-butylamino-β-(3,4,5-trimethoxybenzoxy) - propyl] - 4 - methyl-7,8-dimethoxy-coumarin is obtained in the form of a crystalline powder having a decomposition point of 90°.

Yield: 23 g.-89% of the theoretical.

The 3 - (γ - N-benzyloxy-carbonyl-N-n-butyl-amino-β - hydroxy - propyl) - 4-methyl-7,8-dimethoxy-coumarin used as starting material can be prepared as follows:

(a) 31.2 g. (0.1 mol) 3-(γ-chloro-β-hydroxy-propyl)-4 - methyl - 7,8-dimethoxy-coumarin are dissolved with heating in 250 cc. ethanol and, after the addition of 40 g. (0.55 mol) n-butylamine, stirred under reflux for 15 hours. After cooling down, the reaction product, precipitating in the form of crystals, is filtered off with suction, and the filtrate is concentrated under reduced pressure. After the mother liquor thus obtained has been allowed to stand for a while small quantities of the product may additionally be isolated, which are then recrystallized from ethyl acetate for further purification purposes. Thus, 3 - (γ - n - butylamino-β-hydroxy-propyl)-4-methyl-7,8-dimethoxy-coumarin is obtained having a melting point of 130°.

Yield: 24 g.=69% of the theoretical.

(b) 8 g. (0.081 mol) phosgene are passed, with stirring, and cooling by means of an ice bath into 50 cc. anhydrous toluene. With cooling, a solution of 8 g. (0.074 mol) benzylalcohol in 20 cc. anhydrous toluene is added dropwise. This reaction solution is stirred for ½ hour in an ice bath and then for another 2 hours at room temperature. After having been evaporated to dryness under reduced pressure, the residue is diluted with 20 cc. methylene chloride and added dropwise, with stirring at a temperature of 5–10°, to a solution of 24 g. (0.069 mol) 3-(γ-n-butylamino-β-hydroxy-propyl) - 4 - methyl-7,8-dimethoxy-coumarin and 7.2 g. (0.071 mol) triethylamine in 180 cc. methylene chloride. After having been stirred for 12 hours at room temperature, the reaction solution is washed several times with water, dried with anhydrous sodium sulfate and evaporated to dryness under reduced pressure. The residue is stirred with little anhydrous ether, filtered off with suction and dried. Thus, 3-(γ-N-benzyloxycarbonyl-N-n-butylamino - β - hydroxy - propyl)-4-methyl-7,8-dimethoxy-coumarin is obtained, melting at 109–110°.

Yield: 28 g.=84% of the theoretical.

EXAMPLE 5

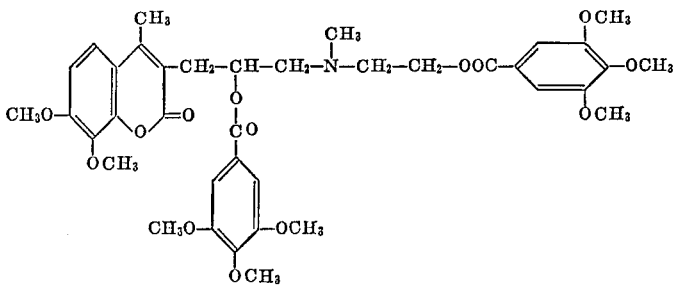

38.75 g. (0.1 mol) of the hydrochloride of 3-(γ-N-methyl-N-β-hydroxyethyl-amino - β - hydroxy-propyl)-4-methyl-7,8-dimethoxy-coumarin are dissolved in 200 cc. anhydrous chloroform and 30.3 g. (0.3 mol) triethylamine are added. Within one hour a solution of 46 g. (0.2 mol) 3,4,5-trimethoxybenzoylchloride in 150 cc. anhydrous chloroform is added dropwise with stirring at room temperature into the limpid reaction mixture. After the decay of the exothermic reaction stirring is continued for 2 hours at 40–50°. The reaction solution obtained is washed at first several times with water, then with a 10% aqueous sodium bicarbonate solution and again with water. The solvent is then distilled off at 40° in a water-jet vacuum, and, for further purification, the residue, a light-yellow oil is dissolved in diluted aqueous hydrochloric acid. This solution is extracted with ether and rendered limpid by filtration. By adding potassium carbonate until the mixture shows an alkaline reaction (pH 9), the desired diester separates out in the form of a colorless oil. The reactant is extracted with ethyl acetate, the ethyl acetate solution is washed several times with water and dried over anhydrous sodium sulfate. The solvent is then distilled off at 40° in a water-jet vacuum and the residue, a colorless oil, is dissolved in anhydrous ether. By adding etheric hydrochloric acid until congo paper turns blue, the hydrochloride of 3-[γ-N-methyl-N-β-(3,4,5-trimethoxybenzoxy)-ethyl - amino-β-(3,4,5-trimethoxybenzoxy)-propyl] - 4 - methyl-7,8-dimethoxy-coumarin is obtained in the form of colorless crystals melting at 118° with decomposition.

Yield: 63 g.=81% of the theoretical.

The hydrochloride of 3-(γ-N-methyl-N-β-hydroxyethyl-amino-β-hydroxy-propyl)-4-methyl-7,8-dimethoxy - coumarin having a melting point of 98–102° which, in Example 5, is used as starting material, is obtained by the reaction of 3-(γ-chloro-β-hydroxy-propyl)-4-methyl-7,8-dimethoxy-coumarin with N-methyl-ethanolamine.

The following starting materials can be prepared analogously:

General formula:

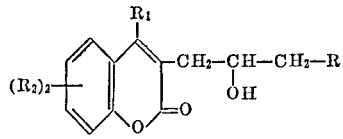

| $(R_2)_2$ | $R_1$ | R | Melting point, degrees |
|---|---|---|---|
| 7,8-$(OCH_3)_2$ | $CH_3$ | —N($CH_3$)—$CH_2CH_2CH_2OH$ | [1] 65 |
| 7,8-$(OCH_3)_2$ | $CH_3$ | —N($C_4H_9$)—$CH_2CH_2OH$ | Oily |
| 7,8-$(OCH_3)_2$ | $CH_3$ | —N[CH($CH_3$)$_2$]—$CH_2CH_2OH$ | [2] 161 |
| 7,8-$(OCH_3)_2$ | $CH_3$ | —N($CH_2$—$C_6H_5$)—$CH_2CH_2OH$ | Oily |
| 7,8-$(OCH_3)_2$ | $C_3H_7$ | —N($CH_3$)—$CH_2CH_2OH$ | [2] 131 |
| 7,8-$(OCH_3)_2$ | $C_6H_5$ | —N($CH_3$)—$CH_2CH_2OH$ | 86 |
| 6,7-$(OCH_3)_2$ | $CH_3$ | —N($CH_3$)—$CH_2CH_2OH$ | [1] 120 |
| 6,7-$(OCH_3)_2$ | $C_6H_5$ | —N($CH_3$)—$CH_2CH_2OH$ | [2] 156 |
| 5,7-$(OCH_3)_2$ | $CH_3$ | —N($CH_3$)—$CH_2CH_2OH$ | [1] 87 |

[1] Base.
[2] Hydrochloride.

Analogously to the description given in Example 5 the following derivatives of the below-mentioned general formula can be prepared:

General formula:

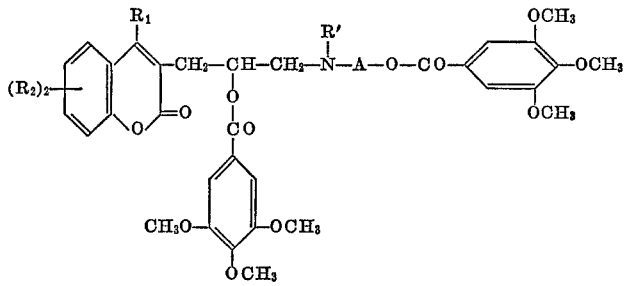

| $(R_2)_2$ | $R_1$ | $R'$ | A | Melting point or decomposition point (hydrochloride), degree |
|---|---|---|---|---|
| 7,8-$(OCH_3)_2$ | $CH_3$ | $CH_3$ | $-CH_2-CH_2-CH_2-$ | 127 |
| 7,8-$(OCH_3)_2$ | $CH_3$ | $C_4H_9$ | $-CH_2-CH_2-$ | 77 |
| 7,8-$(OCH_3)_2$ | $CH_3$ | $CH(CH_3)_2$ | $-CH_2-CH_2-$ | 165 |
| 7,8-$(OCH_3)_2$ | $CH_3$ | $CH_2-C_6H_5$ | $-CH_2-CH_2-$ | 105 |
| 7,8-$(OCH_3)_2$ | $C_3H_7$ | $CH_3$ | $-CH_2-CH_2-$ | 118 |
| 7,8-$(OCH_3)_2$ | $C_6H_5$ | $CH_3$ | $-CH_2-CH_2-$ | 135 |
| 6,7-$(OCH_3)_2$ | $CH_3$ | $CH_3$ | $-CH_2-CH_2-$ | 125 |
| 6,7-$(OCH_3)_2$ | $C_6H_5$ | $CH_3$ | $-CH_2-CH_2-$ | 130 |
| 5,7-$(OCH_3)_2$ | $CH_3$ | $CH_3$ | $-CH_2-CH_2-$ | 114 |

EXAMPLE 6

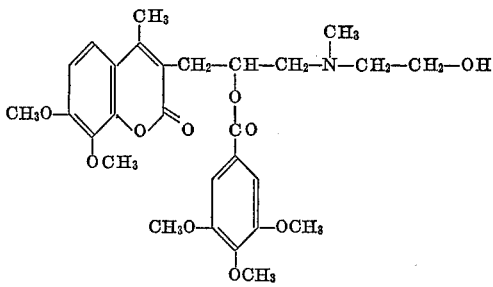

50.6 g. (0.1 mol) 3-[γ-chloro-β-(3,4,5-trimethoxybenzoxy)-propyl]-4-methyl-7,8-dimethoxy-coumarin and 10.6 g. (0.1 mol) sodium carbonate are suspended in 120 cc. of anhydrous chlorobenzene and, after the addition of 8 g. (0.107 mol) N-methylethanolamine, stirred for 12 hours at 120–125°. After cooling down, the precipitated sodium chloride is filtered off with suction and the filtrate is evaporated to dryness under reduced pressure. The residue thus obtained is dissolved in approx. 300 cc. ethyl acetate and shaken out with diluted hydrochloric acid. The aqueous hydrochloric acid phase is separated and rendered alkaline by introducing solid potassium carbonate. The precipitating oily reaction product is dissolved in ether. The etheric solution is dried over potassium carbonate and by introducing gaseous hydrochloric acid, the hydrochloride of 3-[γ-N-methyl-N-β-hydroxyethyl-amino - β - (3,4,5 - trimethoxybenzoxy)-propyl]-4-methyl-7,8-dimethoxy-coumarin is obtained in the form of colorless crystals, which has a decomposition point of 70°.

Yield: 24 g.=41.3% of the theoretical.

The 3-[γ-chloro-β-(3,4,5-trimethoxybenzoxy)propyl]-4-methyl-7,8-dimethoxy-coumarin which is used as starting material can be obtained as follows:

31.2 g. (0.1 mol) 3-(γ-chloro-β-hydroxy-propyl)-4-metyhl-7,8-dimethoxy-coumarin (prepared according to the technique described in British Pat. 1,135,905, Example 2, paragraph 2) and 25 g. (0.108 mol mol) 3,4,5-trimethoxybenzoylchloride are admixed and heated with stirring at aprox. 100°. The reaction mixture is stirred for approx. 5 hours at 100° and allowed to cool down. The solid reaction mixture is then dissolved in ethyl acetate and washed several times with diluted sodium carbonate solution. The ethyl acetate solution is then dried over anhydrous sodium sulfate and evaporated to dryness under reduced pressure. Thus, 3-[γ-chloro-β-(3,4,5-trimethoxybenzoxy)-propyl] - 4 - methyl - 7,8 - dimethoxy-coumarin is obtained in the form of colorless needles having a melting point of 165–167°.

Yield: 41 g.=81% of the theoretical.

Analogously, by reacting 3-(γ-chloro-β-hydroxy-propyl)-4-methyl-6,7-dimethoxy-coumarin with 3,4,5-trimethoxybenzoylchloride, the corresponding 6,7-dimethoxy-coumarin deriavtive melting at 170° is obtained, which is converted into the hydrochloride of 3-[γ-N-methyl-N-β-hydroxyethyl-amino - β - (3,4,5 - trimethoxybenzoxy)-propyl]-4-methyl-6,7-dimethoxy-coumarin having a decomposition point of 116°, when condensed with N-methyl-ethanolamine as described in paragraph 1 of the present example.

EXAMPLE 7

36.0 g. (0.1 mol) 3-[γ-(N-methyl-N-β-cyanoethylamino)-β-hydroxypropyl] - 4 - methyl - 7,8 - dimethoxy-coumarin are dissolved in 300 cc. anhydrous benzene and 10.1 g. (0.1 mol) triethylamine are added. A solution of 23 g. (0.1 mol) 3,4,5-trimethoxybenzoylchloride in 100 cc. anhydrous benzene is added dropwise while stirring within 30 minutes at room temperature. Stirring is continued for 2 hours at room temperature, then for 6 hours under reflux. Subsequently, the reaction mixture is filtered off from the separated triethylamine hydrochloride. The filtrate is washed several times with water, a 10% aqueous sodium bicarbonate solution and again with water. After drying over sodium sulfate, the benzene solution is concentrated in vacuo. The oily residue thus obtained is dissolved in ethyl acetate and, by the addition of etheric hydrochloric acid the hydrochloride of the 3-[γ-(N-methyl - N - β - cyanoethylamino)-β-(3,4,5-trimethoxybenzoxy)-propyl]-4-methyl - 7,8 - dimethoxy-coumarin is precipitated in the form of colorless needles having a decomposition point of 192–193°.

Yield: 32 g.=54.2% of the theoretical.

The 3-[γ-(N-methyl-N-β-cyanoethylamino)-β-hydroxypropyl]-4-methyl - 7,8 - dimethoxy-coumarin required as starting material may be prepared according to the method described in the above Example 1, para 2, by reacting the 3-(γ-chloro-β-hydroxypropyl)-4-methyl-7,8-dimethoxy-coumarin with β-methyl-aminopropionitrile.

The same starting material is also obtained by the addition of acrylonitrile to 3-(γ-N-methylamino-β-hydroxypropyl)-4-methyl-7,8-dimethoxy-coumarin according to the following description:

30.7 g. (0.1 mol) 3-(γ-N-methylamino-β-hydroxypropyl)-4-methyl-7,8-dimethoxy-coumarin, prepared analogously to the method described in the above Example 4, para 1 by reacting 3-(γ-chloro-β-hydroxypropyl)-4-methyl-7,8-dimethoxy-coumarin with methylamine, are dissolved in 200 cc. anhydrous alcohol and admixed with 20 g. freshly distilled acrylonitrile. Stirring is continued for 4 hours at room temperature and for another 6 hours under reflux. After cooling down, a further portion of 20 g. freshly distilled acrylonitrile is added and for terminating the reaction, the mixture is stirred for 6 hours under reflux. Subsequently, the reaction mixture is concentrated in vacuo and the residue is dissolved in dilute hydrochloric acid. The solution which is filtered so as to become limpid, is rendered alkaline by the addition of solid potassium carbonate and the base which separates in the form of an oil is dissolved in ethyl acetate. After drying, the ethyl acetate solution is concentrated in vacuo. Obtained is, in the formed of a colorless oil the 3-[γ-(N-methyl - N - β - cyanoethylamino)-β-hydroxypropyl]-4-methyl-7,8-dimethoxy-coumarin.

Analogously to the method described hereinbefore, the following initial products may be obtained.

General formula:

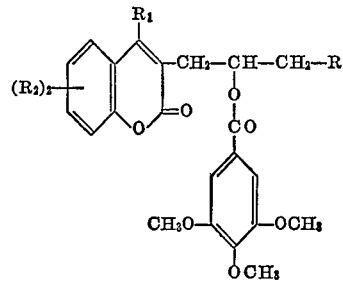

| (R₂)₂ | R₁ | R | Melting point, degree |
|---|---|---|---|
| 7,8-(OCH₃)₂ | CH₃ | —N(CH₂CH₂COOC₂H₅)₂ | Oily. |
| 7,8-(OCH₃)₂ | CH₃ | —N(CH₂CH₂CH₂OC₂H₅)CH₂CH₂CONH₂ | Oily. |
| 7,8-(OCH₃)₂ | CH₃ | —N(CHCH₂CH₂OC₂H₅)CH₂CH₂CN | Oily. |
| 7,8-(OCH₃)₂ | CH₃ | —N(C₄H₉)CH₂CH₂CONH₂ | 160–163 |
| 7,8-(OCH₃)₂ | C₃H₇ | —N(CH₃)CH₂CH₂CN | Oily. |
| 7,8-(OCH₃)₂ | C₆H₅ | —N(CH₃)CH₂CH₂CN | Oily |
| 7,8-(OCH₃)₂ | CH₃ | —N)CH₃)CH₂CH₂CH₂—COOC₂H₅ | Oily |
| 7,8-(OCH₃)₂ | CH₃ | —N(CH₃)CH₂CH₂CON(C₂H₅)₂ | ¹ 207 |
| 6,7-(OCH₃)₂ | CH₃ | —N(CH₃)CH₂CH₂CH₂CN | Oily. |

¹ Hydrochloride.

Analogously to the process described in para 3 of the present example the following starting materials may be obtained:

| (R₂)₂ | R₁ | R | Melting point, degree |
|---|---|---|---|
| 7,8-(OCH₃)₂ | CH₃ | —N(CH₃)CH₂CH₂COCH₃ | Oily |
| 7,8-(OCH₃)₂ | CH₃ | —N(C₄H₉)CH₂CH₂COCH₃ | 84 |

Analogously to the description given in this example, the following compounds of the present invention may be prepared from the above starting materials:

General formula

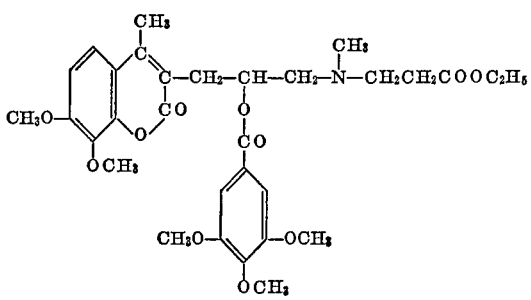

| (R₂)₂ | R₁ | R | Melting point hydrochloride), degree |
|---|---|---|---|
| 7,8(OCH₃)₂ | CH₃ | —N(CH₂CH₂COOC₂H₅)₂ | 108 |
| 7,8(OCH₃)₂ | CH₃ | —N(CH₂CH₂CH₂OC₂H₅)CH₂CH₂CONH₂ | 184 |
| 7,8(OCH₃)₂ | CH₃ | —N(CH₂CH₂CH₂OC₂H₅)CH₂CH₂CN | ¹ 98 |
| 7,8(OCH₃)₂ | CH₃ | —N(C₄H₉)CH₂CH₂CONH₂ | 103 |
| 7,8(OCH₃)₂ | C₃H₇ | —N(CH₃)CH₂CH₂CN | 121 |
| 7,8(OCH₃)₂ | C₆H₅ | —N(CH₃)CH₂CH₂CN | 123 |
| 7,8(OCH₃)₂ | CH₃ | —N(CH₃)CH₂CH₂CH₂COOC₂H₅ | ² 70 |
| 7,8(OCH₃)₂ | CH₃ | —N(CH₃)CH₂CH₂CH₂CON(C₂H₅)₂ | ² 75 |
| 6,7(OCH₃)₂ | CH₃ | —N(CH₃)CH₂CH₂CN | 150 |

¹ Base.
² Decomposed.

EXAMPLE 8

40.7 g. (0.1 mol) 3-[γ-(N-methyl-N-β-ethoxycarbonylethylamino)-β-hydroxypropyl] - 4 - methyl - 7,8 - dimethoxy-coumarin are dissolved in 350 cc. anhydrous toluene and, after the addition of 10.1 g. (0.1 mol) triethylamine, a solution of 23 g. (0.1 mol) 3,4,5-trimethoxybenzoylchloride in 100 cc. anhydrous toluene is added dropwise at room temperature. The reaction mixture is stirred for 2 hours at room temperature and subsequently heated during 6 hours to the boil. After cooling down, the reaction mixture is filtered off from the separated triethylamine hydrochloride and the filtrate is worked up as described in Example 1. Obtained is, in the form of colorless crystals, the 3 - [γ - (N - methyl - N - β - ethoxycarbonylethylamino)-β-(3,4,5 - trimethoxybenzoxy) - propyl] - 4-methyl-7,8-dimethoxy - coumarin hydrochloride having a melting point of 192°.

Yield: 28 g.=44% of the theoretical.

The 3-(γ-N-methyl-N-β-ethoxycarbonylethylamino - β-hydroxypropyl)-4 - methyl - 7,8 - dimethoxy - coumarin required as starting material may be prepared as follows:

30.7 g. (0.1 mol) 3-(γ - methylamino - β - hydroxypropyl)-4-methyl-7,8 - dimethoxy - coumarin are dissolved in 250 cc. chlorobenzene and, after the addition of 10.6 g. (0.1 mol) sodium carbonate and 27.3 g. (0.2 mol) ethyl-β-chloropropionate, stirred during 15 hours under reflux. After cooling down, the mixture is filtered off from the inorganic salts and the filtrate is evaporated to dryness in vacuo. For further purification, the residue is dissolved in dilute hydrochloric acid, the insolute is extracted with ether and the solution is rendered alkaline by the addition of potassium carbonate. Subsequently, the base which has separated in the form of an oil is dissolved in ethyl acetate. After evaporating the ethyl acetate solution to dryness, one obtains the 3-[γ-(N-methyl-N - β - ethoxycarbonylethylamino)-β-hydroxypropyl]-4-methyl-7,8 - dimethoxy-coumarin in the form of a colorless oil.

Yield: 15 g.=37% of the theoretical.

The same product is also obtained by reacting, analogously to the process described in Example 7, para 3, 3-(γ-methylamino-β-hydroxypropyl)-4-methyl - 7,8 - dimethoxy-coumarin with ethyl acrylate.

EXAMPLE 9

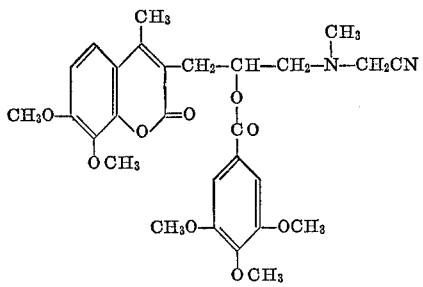

34.6 g. (0.1 mol) 3-(γ-N-methyl - N - cyanomethylamino-β-hydroxypropyl) - 4 - methyl - 7,8 - dimethoxy-coumarin are dissolved in 280 cc. anhydrous toluene and admixed with 10.1 g. (0.1 mol) triethylamine. A solution of 25.3 g. (0.11 mol) 3,4,5-trimethoxybenzoylchloride in 120 cc. anhydrous toluene is then added dropwise while stirring at room temperature and stirring is continued for another 2 hours at room temperature. Then, the reaction mixture is heated to the boil and stirred for 6 hours under reflux. After cooling down, it is filtered off from the separated triethylamine hydrochloride and the filtrate is evaporated to dryness in vacuo. Subsequently, the residue is dissolved in dilute acetic acid and filtered off from the insolute. The filtrate is rendered alkaline by the addition of aqueous potassium carbonate solution and the base which has separated in the form of an oil is dissolved in ethyl acetate. The ethyl acetate solution being dried over potassium carbonate, hydrochloric acid is added dropwise whereby the 3-[γ-(N-methyl - N - cyanomethylamino)-β - (3,4,5 - trimethoxybenzoxy) - propyl]-4-methyl-7,8-dimethoxy-coumarin precipitates in the form of colorless crystals having a decomposition point of 118–120°.

Yield: 30 g.=52% of the theoretical.

The 3 - (γ-N-methyl-N-cyanomethylamino-β-hydroxypropyl)-4-methyl-7,8-dimethoxy-coumarin used as starting material may be prepared as follows:

20.8 g. (0.2 mol) sodium bisulfite are dissolved in 100 cc. water and 16 g. of a 40% aqueous formaldehyde solution are added dropwise, first while stirring, then while cooling. Stirring is continued for another 15 minutes, then 30.7 g. (0.1 mol) 3-(γ-N-methylamino-β-hydroxypropyl)-4-methyl - 7,8 - dimethoxy-coumarin, prepared by reacting analogously to the method described in the above Example 4, para 1, 3-(γ-chloro-β-hydroxypropyl)-4-methyl-7,8-dimethoxy-coumarin with methylamine, are introduced into the reaction mixture. Subsequently, a solution of 12 g. potassium cyanide in 25 cc. water is added dropwise while stirring and stirring is continued for 2 hours at 35–40°. The reaction mixture is allowed to stand overnight, whereby the reaction product precipitates in the form of crystals which are sucked off and washed several times with water. Obtained is, in the form of colorless needles, the 3-(γ-N-methyl-N-cyanomethylamino-β-hydroxypropyl) - 4 - methyl - 7,8 - dimethoxy-coumarin melting at 118–120°.

Yield: 29 g.=84% of the theoretical.

The same product is also obtained by reacting according to the method described in Example 8, para 2, the 3-(γ-methylamino-β-hydroxypropyl) - 4 - methyl - 7,8-dimethoxy-coumarin with chloroacetonitrile.

EXAMPLE 10

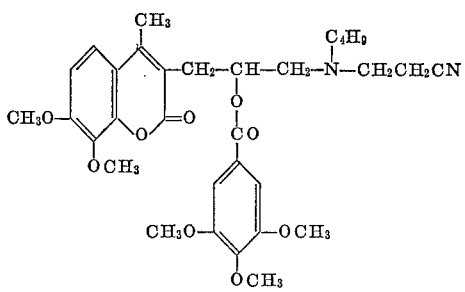

50.6 g. (0.1 mol) 3-[γ-chloro-β - (3,4,5 - trimethoxybenzoxy)-propyl]-4-methyl - 7,8 - dimethoxy-coumarin, prepared according to the process described in the above Example 6, para 2, and 10.6 g. (0.1 mol) soda are suspended in 120 cc. anhydrous chlorobenzene and, after the addition of 12.6 g. (0.1 mol) β-n-butylaminopropionitrile, stirred for 15 hours at 130°. After cooling down, the reaction mixture is filtered off from the precipitated sodium chloride and the filtrate is evaporated to dryness in vacuo. The thusly obtained residue is dissolved in approx. 300 cc. ethyl acetate and the solution is shaken with dilute hydrochloric acid. The aqueous, hydrochloric acid solution is then rendered alkaline by the addition of solid potassium carbonate and the reaction product which precipitates in the form of an oil is dissolved in ether. The etheric solution is dried over potassium carbonate and, by the introduction of gaseous hydrogen chloride, the 3 - [γ-(N-n-butyl-N-β-cyanoethylamino)-β - (3,4,5 - trimethoxybenzoxy)-propyl] - 4 - methyl - 7,8 - dimethoxy-coumarin hydrochloride is precipitated in the form of colorless needles melting at 174°.

Yield: 31 g.=49% of the theoretical.

EXAMPLE 11

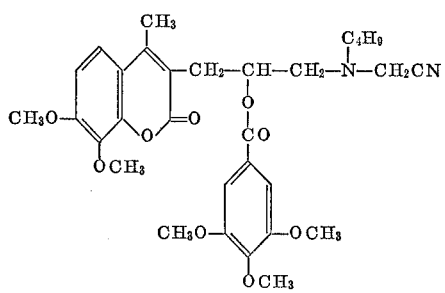

54.3 g. (0.1 mol) 3-[γ-(N-n-butylamino)-β-(3,4,5-trimethoxybenzoxy)-propyl] - 4 - methyl - 7,8 - dimethoxy-coumarine, prepared according to the method described in the above Example 4, and 10.6 g. (0.1 mol) soda are suspended in 250 cc. anhydrous chlorobenzene and, after the addition of 9.8 g. (0.13 mol) chloroacetonitrile, stirred for 12 hours at 120°. After cooling down, the reaction mixture is filtered off from the inorganic salts and the filtrate is concentrated in vacuo. The thusly obtained residue is dissolved in approx. 500 cc. ethyl acetate and the solution is shaken with dilute hydrochloric acid. The aqueous hydrochloric acid phase is separated and rendered alkaline by the addition of solid potassium carbonate. The reaction product which separates in the form of an oil is dissolved in ethyl acetate. The solution is dried over potassium carbonate and, by the introduction of gaseous hydrogen chloride, the 3-[γ-(N-n-butyl-N-cyanomethylamino)-β-(3,4,5 - trimethoxybenzoxy)-propyl]-4-methyl-7,8-dimethoxy-coumarin hydrochloride is separated in the form of colorless crystals having a decomposition point of 80°.

Yield: 31 g.=50.2% of the theoretical.

EXAMPLE 12

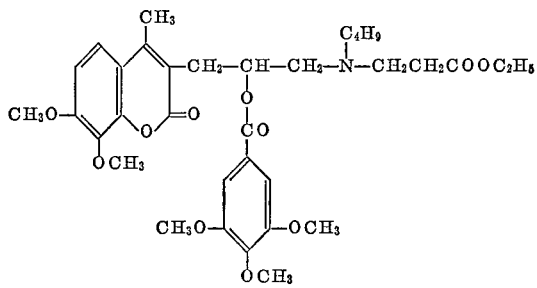

54.3 g. (0.1 mol) 3-[γ-(n-butylamino)-β-(3,4,5-trimethoxybenzoxy)-propyl]-4-methyl-7,8-dimethoxy - coumarin, prepared according to the method described in the above Example 4, are dissolved in 500 cc. anhydrous ethanol and 20 g. (0.2 mol) freshly distilled ethyl acrylate are added dropwise. The reaction mixture is stirred for 24 hours at room temperature and, for terminating the reaction, another portion of 20 g. (0.2 mol) freshly distilled ethyl acrylate is added. Stirring is continued for another 12 hours at room temperature and the reaction mixture is evaporated to dryness in vacuo. The thusly obtained residue is then admixed with dilute hydrochloric acid. For further purification, the hydrochloric acid solution is extracted with ether and the aqueous phase is rendered alkaline by the addition of solid potassium carbonate. The base which separates in the form of an oil is dissolved in either, the solution is dried over potassium carbonate and, by adding dropwise etheric hydrochloric acid, the 3-[γ-(N-n-butyl-N-β-ethoxycarbonylethylamino)-β-(3,4,5 - trimethoxybenzoxy)-propyl]-4-methyl-7,8 - dimethoxy - coumarin hydrochloride is obtained in the form of colorless crystals melting at 173–174° .

Yield: 32 g.=47.2% of the theoretical.

The same reaction product is also obtained by reacting according to the method described in Example 8, para 2, the 3 - [γ - (n-butylamino)-β-(3,4,5-trimethoxybenzoxy)-propyl]-4-methyl-7,8 - dimethoxycoumarin with ethyl-β-chloropropionate.

What we claim is:
1. A compound having the structural formula

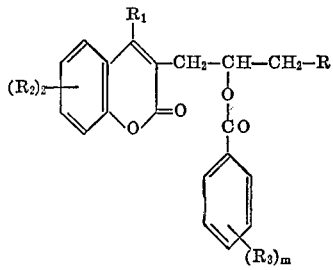

or the hydrochloric acid addition salt thereof wherein R stands for the group

$X_1$ representing alkyl and $Y_1$ representing hydrogen, alkyl, hydroxyalkyl, alkoxyalkyl, dialkylaminoalkyl, alkenyl, cycloalkyl, alkoxyphenyl or alkoxyphenalkyl, the alkyl and alkoxy moieties thereof containing 1–4 carbon atoms, the alkenyl moieties 3–5 carbon atoms, the cycloalkyl moieties 3–7 carbon atoms and the phenalkyl moieties 7–12 carbon atoms or for the group

$X_2$ representing alkyl or alkoxyalkyl or $Y_2$, $Y_2$ representing cyanoalkyl, alkylcarbonylalkyl, alkoxycarbonylalkyl, or amidocarbonylalkyl, the alkyl and alkoxy moieties thereof containing 1–4 carbon atoms or for the group

$X_3$ representing alkyl or benzyl and $Y_3$ trimethoxybenzoxyalkyl, the alkyl moieties thereof containing 1–4 carbon atoms;

$R_1$ is selected from the group consisting of alkyl radicals having 1–4 carbon atoms and phenyl radicals;

$R_2$ is selected from the group consisting of 5,7-, 6,7-, and 7,8-positioned alkoxy groups having 1–4 carbon atoms;

$R_3$ is selected from alkoxy groups having 1–4 carbon atoms and $m$ is selected from the group consisting of 1, 2, and 3, 2. Coumarin compounds as set forth in claim 1 wherein R is selected from the group consisting of lower alkylamino, lower dialkylamino, hydroxy lower alkyl lower alkylamino, lower alkoxyalkyl lower alkylamino, lower alkoxycarbonyl lower alkyl lower alkylamino, lower alkoxy phenyl lower alkyl lower alkylamino, cyanomethyl lower alkylamino and trimethoxybenzoxy lower alkyl lower alkylamino; $R_1$ being selected from methyl, propyl and phenyl; $R_2$ being selected from 5,7-, 6.7- or 7,8-positioned methoxy and butoxy; and $R_3$ being 3,4,5-positioned methoxy or butoxy.

3. 3-[γ-(N-methyl-N-β-cyanoethyl-amino)-β-(3,4,5 - trimethoxybenzoxy)-propyl]-4-methyl-7,8 - dimethoxy - coumarin and its hydrochloric acid addition salt.

4. 3 - [γ - (N - methyl - N - cyclohexyl - amino) - β- (3,4,5 - trimethoxybenzoxy) - propyl] - 4 - methyl - 7,8-dimethoxy-coumarin and its hydrochloric acid addition salt.

5. 3 - [γ - {N - methyl - N - β - (3,4,5 - trimethoxybenzoxy) - ethyl - amino} - β - (3,4,5 - trimethoxybenzoxy)-propyl]-4-methyl-7,8-dimethoxy-coumarin and its hydrochloric acid addition salt.

6. 3 - [γ - (N - n- butyl - N - β - hydroxyethyl - amino)-β - (3,4,5 - trimethoxybenzoxy) - propyl] - 4 - methyl - 7,8-dimethoxy-coumarin and its hydrochloric acid addition salt.

7. 3 - [γ - (N - n - butyl - N - β - cyanoethyl - amino)-β - (3,4,5 - trimethoxybenzoxy) - propyl] - 4 - methyl - 7,8-dimethoxy-coumarin and its hydrochloric acid addition salt.

References Cited
UNITED STATES PATENTS
3,652,557   3/1972   Beyerle et al. _____ 260—343.2

JOHN M. FORD, Primary Examiner

U.S. Cl. X.R.
424—279